United States Patent
Hara et al.

(10) Patent No.: US 7,179,559 B2
(45) Date of Patent: Feb. 20, 2007

(54) PROTON CONDUCTOR, SINGLE-ION CONDUCTOR, AND PROCESSES FOR PRODUCING THESE

(75) Inventors: Tomitaro Hara, Kanagawa (JP);
Ryosuke Takagi, Kanagawa (JP);
Kazuhiro Noda, Kanagawa (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 10/467,533

(22) PCT Filed: Dec. 11, 2002

(86) PCT No.: PCT/JP02/12955

§ 371 (c)(1),
(2), (4) Date: Aug. 7, 2003

(87) PCT Pub. No.: WO03/050823

PCT Pub. Date: Jun. 19, 2003

(65) Prior Publication Data

US 2004/0062972 A1 Apr. 1, 2004

(30) Foreign Application Priority Data

Dec. 11, 2001 (JP) ............................. 2001-377797
Nov. 27, 2002 (JP) ............................. 2002-344442

(51) Int. Cl.
*H01M 8/10* (2006.01)
(52) U.S. Cl. ........................................ 429/33; 429/309
(58) Field of Classification Search .................. 429/33, 429/309, 314

See application file for complete search history.

(56) References Cited

U.S. PATENT DOCUMENTS

| 5,795,668 | A | | 8/1998 | Banerjee ........................ 429/33 |
| 5,981,097 | A | * | 11/1999 | Rajendran ...................... 429/33 |
| 5,985,477 | A | | 11/1999 | Iwasaki et al. ................. 429/33 |
| 6,607,856 | B2 | * | 8/2003 | Suzuki et al. ............. 429/33 X |
| 6,716,548 | B1 | * | 4/2004 | Kaliaguine et al. ............ 429/33 |
| 2003/0087972 | A1 | * | 5/2003 | Taniguchi et al. ............ 521/27 |

FOREIGN PATENT DOCUMENTS

| EP | 1 113 517 | | 7/2001 |
| JP | 01-282237 | * | 11/1989 |
| JP | 10-021943 | | 1/1998 |
| JP | 2001-236973 | | 8/2001 |
| JP | 2002-8440 | | 1/2002 |

* cited by examiner

*Primary Examiner*—Stephen J. Kalafut
(74) *Attorney, Agent, or Firm*—Sonnenschein Nath & Rosenthal LLP (57) ABSTRACT

Provided are a proton conductor and a single ion conductor both having higher conductivity and a wider operating temperature range, and a method of producing the same. A polymer including a structure portion represented by Chemical Formula 49, and an organic compound represented by Chemical Formula 50 or an organic compound represented by Chemical Formula 51 are included. Each of R1, R2, R3 and R4 is a component including carbon, and each of X1, X2, X3, X4 and X5 is a proton dissociative group. Further, n is n>1, and p is p>0, and the number of carbons in R4 is within a range from 1 to 4. Proton transfer can be promoted by an ether bond or the proton dissociative group of the organic compound, and the number of protons can be increased by the proton dissociative group of the organic compound, thereby the proton transfer can be smoothed.

10 Claims, 3 Drawing Sheets

PROTON CONDUCTOR, SINGLE-ION CONDUCTOR, AND PROCESSES FOR PRODUCING THESE

BACKGROUND OF THE INVENTION

The present invention relates to a proton conductor and a single ion conductor both used for devices in which cation or proton transfer occurs, such as secondary batteries, fuel cells, hydrogen sensors, bioelectrodes or the like, and a method of producing the same.

As a kind of solid electrode having an ion conducting mechanism, there is a single ion conducting high molecular weight film in which counter ion species are fixed in a high molecular weight compound, and only ion species, that is, only either cations or anions are transferred. As the single ion conducting high molecular weight film, for example, Nafion (trademark) developed by E. I. Du Pont in 1969 is well known. Actual researches on the mechanism or the like were actively pursued in 1980s, and synthesis of some ion conductors such as a polyethylene glycol derivative in which a carboxylic acid group (carboxylic group) or a sulfonic acid group (sulfonic group) is bonded to a side chain, and the mechanisms of the ion conductors have been studied. After that, as attention has been given to technologies relating to fuel cells again, because of a growing interest in environmental issues, researches on the ion conductors as electrolyte films for solid electrolyte fuel cells have been actively pursued, and in recent years, a large number of researches has been pursued.

Accordingly, researches on single ion conductors, specifically proton conductors are actively pursued at present. Proton conducting compounds are widely applicable, and are expected to be applied in various fields including not only the electrolyte films for solid electrolyte fuel cells but also diaphragms for hydrogen sensors, biomimetic hydrogen transfer films, materials for electrochromic displays, proton conducting films for chemical reactors, electrolyte films for proton transfer type secondary batteries and so on, therefore, a large number of researches including basic researches have been pursued.

However, the single ion conductor has a disadvantage, that is, low ionic conductivity. In a polyethylene glycol ion conducting macromolecule or the like, temperature dependence of a segment motion of the macromolecule has a large influence upon ionic conductivity, so the macromolecule has not surpassed liquid conductors in ionic conductivity yet. Moreover, the proton conductor is highly susceptible to water (proton carrier) existing in a film, so in a range higher than 100° C. which is the boiling point of water, the number of proton carriers decreases, thereby the proton conductivity pronouncedly declines. Therefore, a problem that a temperature range in which the proton conductor can be practically used is limited to 100° C. or less arises.

Accordingly, for example, an electrolyte film in which an inorganic substance having an oxygen functional group is introduced into a proton conducting compound so as to develop higher material strength and higher proton conductivity has been proposed (for example, refer to Japanese Unexamined Patent Application Publication No. 2001-155744). Further, a complex film in which a high molecular weight compound having a large number of sulfonic acid groups and a cation transfer type high molecular weight compound with low glass transfer temperature are mixed with each other so as to obtain higher ionic conductivity and a wider operating temperature range has been proposed (for example, refer to Japanese Patent No. 2962360).

However, in a proton conductor disclosed in Japanese Unexamined Patent Application Publication No. 2001-155744, film strength thereof can be improved, but proton conductivity thereof still has dependence on water, so during use of the proton conductor, water control is required. Therefore, the conventional problems cannot be completely overcome. Moreover, in a proton conductor disclosed in Japanese Patent No. 2962360, the high molecular weight compound is used as an ion carrier, so even in a state in which no water exists, proton conduction is developed, however, the proton conduction is controlled by a segment motion of a macromolecule, thereby, conductivity without water is low. Therefore, there is a problem that further contrivance to practically use the proton conductor is required.

In view of the foregoing, it is an object of the present invention to provide a proton conductor and a single ion conductor both having higher conductivity and a wider operating temperature range, and a method of producing the same.

SUMMARY OF THE INVENTION

A first proton conductor according to the invention comprises a polymer including a structure portion represented by Chemical Formula 1; and an organic compound including a structure portion having an ether bond and a second proton dissociative group bonded to the structure portion having an ether bond. In Chemical Formula 1, R1 represents a component including carbon (C), and X1 represents a first proton dissociative group, and n is n>1.

A second proton conductor according to the invention comprises a polymer including a structure portion represented by Chemical Formula 2; and an organic compound represented by Chemical Formula 3. In Chemical Formula 2, R1 and X1 represent a component including carbon and a first proton dissociative group, respectively, and n is n>1. Further, in Chemical Formula 3, R4 represents a component including carbon, each of X4 and X5 represents a third proton dissociative group, and the number of carbons in the component R4 is within a range from 1 to 4.

A first single ion conductor according to the invention comprises a polymer including a structure portion represented by Chemical Formula 4; and an organic compound including a structure portion having an ether bond and a second cation dissociative group bonded to the structure portion having an ether bond. In Chemical Formula 4, R1 and Z1 represent a component including carbon and a first cation dissociative group, respectively, and n is n>1.

A second single ion conductor according to the invention comprises a polymer including a structure portion represented by Chemical Formula 5; and an organic component represented by Chemical Formula 6. In Chemical Formula 5, R1 and Z1 represent a component including carbon and a first cation dissociative group, respectively, and n is n>1. Further, in Chemical Formula 6, R4 represents a component including carbon, and each of Z4 and Z5 represents a third cation dissociative group, and the number of carbons in the component R4 is within a range from 1 to 4.

A first method of producing a proton conductor according to the invention comprises the step of: impregnating a polymer including a structure portion represented by Chemical Formula 7 with an organic compound including a structure portion having an ether bond and a second proton dissociative group bonded to the structure portion having an ether bond, or a solution prepared by dissolving the organic compound in a solvent. In Chemical Formula 7, R1 and X1 represent a component including carbon and a first proton dissociative group, respectively, and n is n>1.

A second method of producing a proton conductor according to the invention comprises the step of: mixing an organic compound and a polymer in a solvent, and then evaporating the solvent, wherein the organic compound includes a structure portion having an ether bond and a functional group bonded to the structure portion having an ether bond, and the functional group is at least one kind selected from a second proton dissociative group and a group capable of becoming the second dissociative group by ion exchange, and the polymer includes a structure portion represented by Chemical Formula 8. In Chemical Formula 8, R1 represents a component including carbon, and x1 represents at least one kind selected from a first proton dissociative group and a group capable of becoming the first proton dissociative group by ion exchange, and n is n>1.

A third method of producing a proton conductor according to the invention comprises the step of: impregnating a polymer including a structure portion represented by Chemical Formula 9 with an organic compound represented by Chemical Formula 10 or a solution prepared by dissolving the organic compound in a solvent. In Chemical Formula 9, R1 and X1 represent a component including carbon and a first proton dissociative group, respectively, and n is n>1. In Chemical Formula 10, R4 represents a component including carbon, and each of X4 and X5 represents a third proton dissociative group, and the number of carbons in the component R4 is within a range from 1 to 4.

A fourth method of producing a proton conductor according to the invention comprises the step of: mixing a polymer represented by Chemical Formula 11 and an organic compound represented by Chemical Formula 12 in a solvent, and then evaporating the solvent. In Chemical Formula 11, R1 represents a component including carbon, x1 represents at least one kind selected from a first proton dissociative group and a group capable of becoming the first proton dissociative group by ion exchange, and n is n>1. Further, in Chemical Formula 12, R4 represents a component including carbon, and each of x4 and x5 represents at least one kind selected from a third proton dissociative group and a group capable of becoming the third proton dissociative group by ion exchange, the number of carbons in the component R4 is within a range from 1 to 4.

A first method of producing a single ion conductor according to the invention comprises the step of: impregnating a polymer with an organic compound or a solution prepared by dissolving the organic compound in a solvent, wherein the organic compound includes a structure portion having an ether bond and a functional group bonded to the structure portion having an ether bond, and the functional group is at least one kind selected from a second cation dissociative group and a group capable of becoming the second cation dissociative group by ion exchange, and the polymer includes a structure portion represented by Chemical Formula 13. In Chemical Formula 13, R1 represents a component including carbon, and z1 represents at least one kind selected from a first cation dissociative group and a group capable of becoming the first cation dissociative group by ion exchange, and n is n>1.

A second method of producing a single ion conductor according to the invention comprises the step of mixing an organic compound and a polymer in a solvent, and then evaporating the solvent, wherein the organic compound includes a structure portion having an ether bond and a functional group bonded to the structure portion having an ether bond, and the functional group is at least one kind selected from a second cation dissociative group and a group capable of becoming the second cation dissociative group by ion exchange, and the polymer includes a structure portion represented by Chemical Formula 14. In Chemical Formula 14, R1 represents a component including carbon, and z1 represents at least one kind selected from a first cation dissociative group and a group capable of becoming the first cation dissociative group by ion exchange, and n is n>1.

A third method of producing a single ion conductor comprises the step of: impregnating a polymer including a structure portion represented by Chemical Formula 15 with an organic compound represented by Chemical Formula 16 or a solution prepared by dissolving the organic compound in a solvent. In Chemical Formula 15, R1 represents a component including carbon, and z1 represented at least one kind selected from a first cation dissociative group and a group capable of becoming the first cation dissociative group by ion exchange, and n is n>1. Further, in Chemical Formula 16, R4 represents a component including carbon, each of z4 and z5 represents at least one kind selected from a third cation dissociative group and a group capable of becoming the third cation dissociative group by ion exchange, and the number of carbons in the component R4 is within a range from 1 to 4.

A fourth method of producing a single ion conductor according to the invention comprises the step of: mixing a polymer having a structure portion represented by Chemical Formula 17 and an organic compound represented by Chemical Formula 18 in a solvent, and then evaporating the solvent. In Chemical Formula 17, R1 represents a component including carbon, and z1 represents at least one kind selected from a first cation dissociative group and a group capable of becoming the first cation dissociative group by ion exchange, and n is n>1. Further, in Chemical Formula 18, R4 represents a component including carbon, and each of z4 and z5 represents at least one kind selected from a third cation dissociative group and a group capable of becoming the third cation dissociative group by ion exchange, and the number of carbons in component R4 is within a range from 1 to 4.

In the first proton conductor and the first single ion conductor according to the invention, the ether bond of the organic compound functions as an ion carrier. Moreover, carrier concentration in the conductor can be increased by the second proton dissociative group or the second cation dissociative group of the organic compound. Therefore, higher proton conductivity or higher cation conductivity can be obtained in a wider temperature range.

In the second proton conductor and the second single ion conductor according to the invention, carrier concentration in the conductor can be increased by the second proton dissociative group or the second cation dissociative group of the organic compound, and the second proton dissociative group or the second cation dissociative group functions as an ion carrier. Therefore, higher proton conductivity or higher cation conductivity can be obtained in a wider temperature range.

In the first through the fourth methods of producing a proton conductor or the first through the fourth methods of producing a single ion conductor according to the invention, the polymer is impregnated with the organic compound or the solution prepared by dissolving the organic compound in a solvent, or the polymer and the organic compound are mixed in a solvent, thereby the proton conductor or the single ion conductor according to the invention can be obtained.

DETAILED DESCRIPTION OF THE PRESENTLY PREFERRED EMBODIMENTS

Preferred embodiment of the invention will be described in detail below referring to the accompanying drawings.

[First Embodiment]

A proton conductor according to a first embodiment of the invention is a mixed complex including a polymer A and an organic compound B. The polymer A includes a structure portion represented by Chemical Formula 19. In Chemical Formula 19, R1 and X1 represent a component including carbon and a first proton dissociative group, respectively, and n is n>1.

The component R1 may include, for example, carbon as a main skeleton, and nitrogen (N), fluorine (F), sulfur (S), oxygen (O), hydrogen (H) or the like. Among them, nitrogen, fluorine, sulfur and oxygen may be included in substitution for hydrogen bonded to carbon, or may be included in substitution for carbon as the main skeleton. As a specific structure of the component $R_1$, for example, a C—C bond as the main skeleton, and a C=C bond, a C—N bond, a C≡N bond, a C—F bond, a C—S bond, a C—O bond, a C=O bond, a C—H bond, a N=N bond, a N—S bond, a N—O bond, a N—H bond, a S—S bond, a S—O bond, a S=O bond, a S—H bond, a O—O bond, a O—H bond or the like may be included.

As the first proton dissociative group X1, for example, a —SO$_3$H group (sulfonic acid group), a —COOH group (carboxylic acid group), a —OH group (hydroxyl group) or the like is cited. The first proton dissociative group X1 is not necessarily limited to one kind, and may include two or more kinds.

As a typical polymer A with such a structure, a sulfonic acid fluorocarbon resin, a carboxylic acid fluorocarbon resin or the like is cited. As a specific trade name, Nafion (trademark) manufactured by Du Pont, Aciplex (trademark) manufactured by Asahi Chemical, flemion (trademark) manufactured by Asahi Glass or the like is cited.

The organic compound B includes a structure portion having an ether bond and a second proton dissociative group bonded to the structure portion having an ether bond. As the organic compound B, for example, an organic compound represented by Chemical Formula 20, that is, an organic compound in which proton dissociative groups X2 and X3 are bonded to ends of the structure portion having an ether bond is preferable. In Chemical Formula 20, R2 and R3 represent components including carbon, and X2 and X3 represent the second proton dissociative groups, and p is p>0.

Each of the components R2 and R3 may include, for example, carbon as a main skeleton, and hydrogen, halogen or the like. Among them, halogen is included in substitution for hydrogen bonded to carbon, and a substitution ratio thereof is not specifically limited. As specific structures of the components R2 and R3, for example, a C—C bond as a main skeleton, and a C=C bond, a C—H bond, a C—F bond, a C—Cl bond, a C—Br bond, a C—I bond or the like may be included. Assuming that the number of carbons per unit of the component R2 is m, and the number of carbons per unit of the component R3 is o, a ratio between the total number of carbons (m+o) per unit of the component R2 and the component R3 and the number of oxygen atoms per unit is determined by 1/(m+o), and is within a range of 0<1/(m+o)≦½. Further, the components R2 and R3 may be the same as or different from each other, and may be the same as or different from the component R1 of the polymer A.

As the second proton dissociative groups X2 and X3, for example, as in the case of the first proton dissociative group X1, a —SO$_3$H group, a —COOH group, a —OH group or the like is cited. The second proton dissociative groups X2 and X3 are not necessarily limited to one kind, and may include two or more kinds. Further, the second proton dissociative groups X2 and X3 may be the same as or different from each other, and may be the same as or different from the first proton dissociative group X1.

As such an organic compound B, for example, a glycol compound such as diethylene glycol, triethylene glycol, polyethylene glycol, polypropylene glycol, polybutylene glycol or the like and a derivative thereof are cited. The organic compound B may include one kind or a mixture of two or more kinds.

As described in books (for example, "Macromolecular Complexes 3 Electronic Function" edited by Eishun Tsuchida, Naoki Toshima, Hiroyuki Nishide; Japan Scientific Societies Press), the organic compound B with such a structure has a function as an ion carrier in which the ether bond included in the organic compound B interacts with protons to transfer the protons with a segment motion. Moreover, the organic compound B has a function of increasing the number of protons (carrier concentration) in a proton conductor by the second proton dissociative groups X2 and X3 to smoothly transfer protons. Further, when a vapor pressure is lowered by the second proton dissociative groups X2 and X3, the organic compound B is stably introduced into the polymer A, so these function can be exerted in a wider temperature range.

Therefore, a ratio of the number of units of the first proton dissociative group X1 in the polymer A to the number of units of the second proton dissociative groups X2 and X3 and the number of units of the ether bond in the organic compound B is a factor which highly affect proton conductivity.

For example, assuming that a mole ratio between the polymer A and the organic compound B is the polymer A: the organic compound B=a:b, a ratio of the number of units (=2b) of the second proton dissociative groups X2 and X3 to the number of units (=a×n) of the first proton dissociative group X1 is preferably within a range of $2 \leq 2b/(a \times n) \leq 50$, and more preferably within a range of $25 \leq 2b/(a \times n) \leq 50$. When the number of units of the second proton dissociative groups X2 and X3 is too small, proton transfer cannot be sufficiently smoothed, and on the other hand, when the number is too large, stability of the proton conductor is compromised.

Moreover, in a like manner, assuming that a mole ratio between the polymer A and the organic compound B is the polymer : the organic compound=a:b, a ratio of the number of units (=b×p) of the ether bond of the organic compound B to the number of units (=a×n) of the first proton dissociative group X1 is preferably within a range of $5 \leq (b \times p)/(a \times n) \leq 50$, and more preferably within a range of $25 \leq (b \times p)/(a \times n) \leq 50$. When the number of units of the ether bond is too small, the number of oxygen sites which interacts with protons is too small to sufficiently carry out proton transfer with the segment motion, and on the other hand, the number is too large, stability of the proton conductor is compromised.

In other words, it is preferable that a polymerization degree of the organic compound B is not too large, because the number of units of the second proton dissociative groups X2 and X3 can be increased, and it is preferable that the total number of carbons (m+o) per unit of the components R2 and R3 of the organic compound B is not too large, because the number of units of the ether bond can be increased. For example, the total number of carbons (m+o) per unit of the components R2 and R3 of the organic compound B is preferably within a range of $\frac{1}{6} \leq 1(m+o) \leq \frac{1}{2}$.

The proton conductor with such a structure can be produced through the following steps in the case where the organic compound B is in a liquid state, or is dissolved in a solvent to change into a liquid state.

Figure 1:
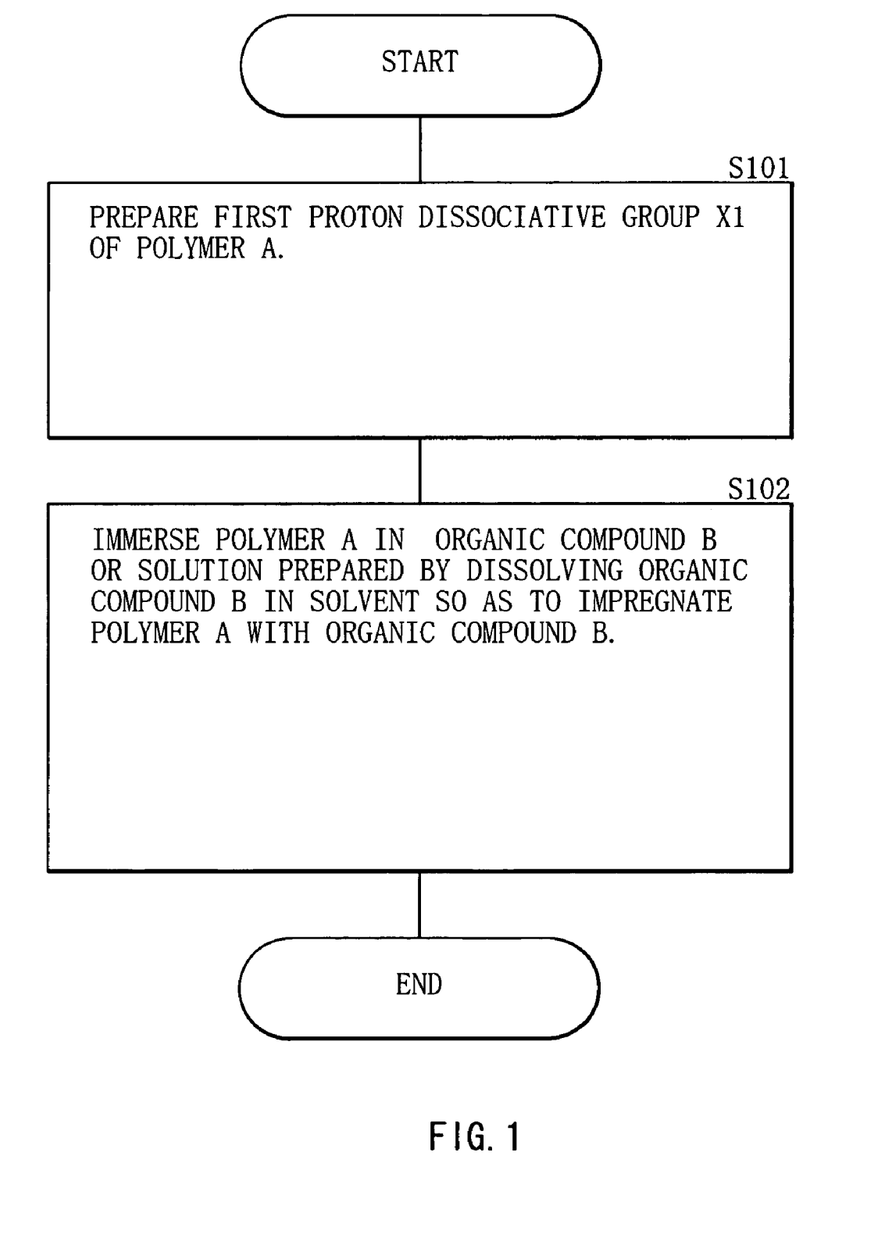
FIG. 1 is a flowchart of a method of producing a proton conductor according to a first embodiment of the invention.

FIG. 1 shows a method of producing the proton conductor according to the embodiment of the invention. Firstly, the first proton dissociative group X1 of the polymer A is prepared by acid treatment or the like (step S101). In a typical method of the acid treatment, for example, the polymer A is immersed in a 5% hydrogen peroxide solution or a 0.5 mol/l sulfuric acid solution, and then the solution is stirred while heating. After the acid treatment, the polymer A is cleaned with pure water so as to leave no residue by the acid treatment.

Next, the polymer A is immersed in the organic compound B or a solution prepared by dissolving the organic compound B in a solvent, and then the polymer A is impregnated with the organic compound B (step S102). The first proton dissociative group X1 of the polymer A and the ether bond of the organic compound B interact with each other, so the organic compound B is uniformly introduced into the polymer A. At this time, if necessary, vacuum treatment, heat treatment or the like may be carried out. Thereby, the proton conductor according to the embodiment can be obtained.

Moreover, in the case where the organic compound B is in a solid state, or the organic compound B can be dissolved in a solvent only in low concentrations, for example, the proton conductor is produced through the following steps.

Figure 2:
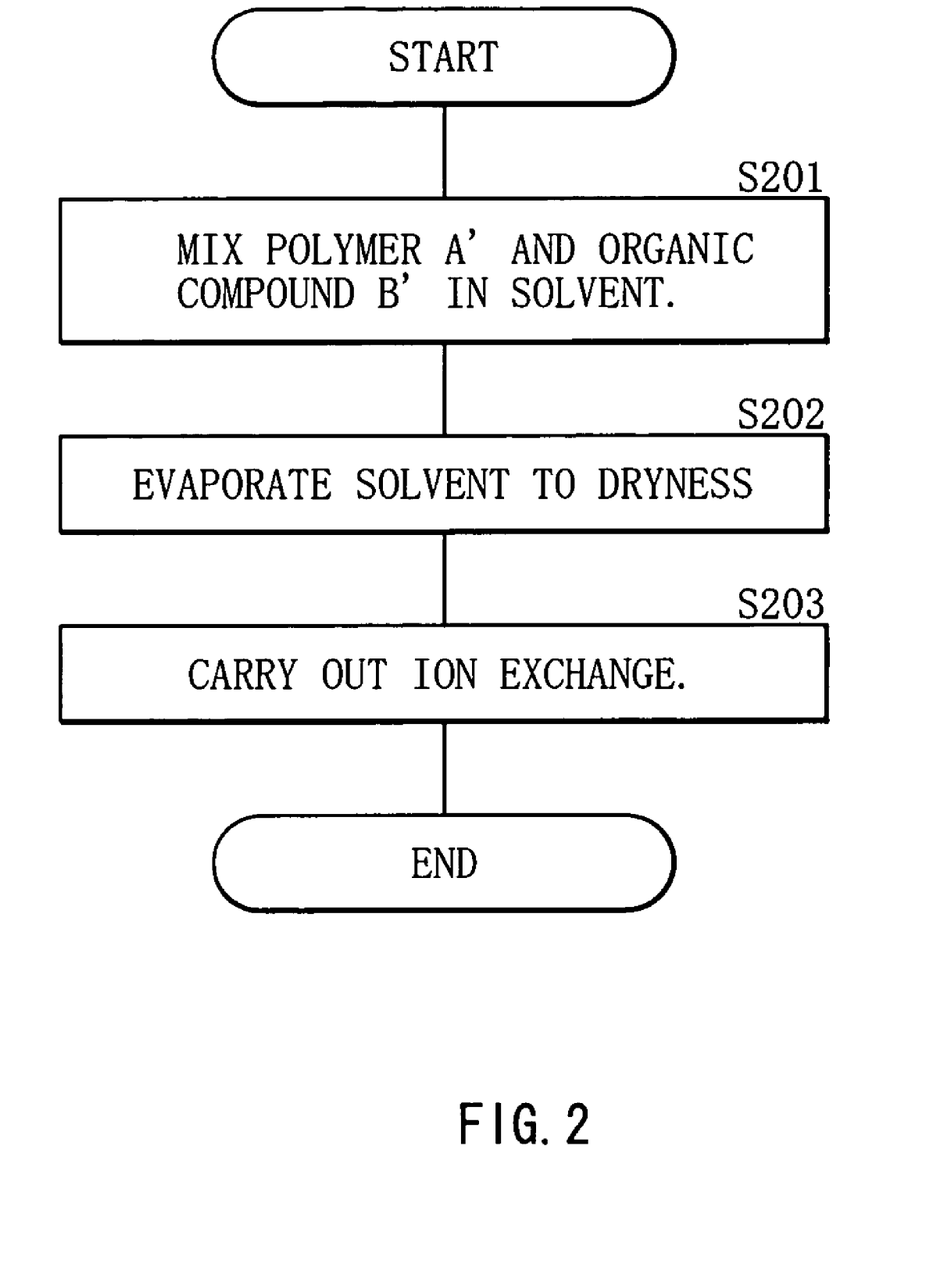
FIG. 2 is a flowchart of another method of producing the proton conductor according to the first embodiment of the invention.

FIG. 2 shows another method of producing the proton conductor according to the embodiment. Firstly, A polymer A' having a structure portion represented by Chemical Formula 21 is prepared, and an organic compound B' including a structure portion having an ether bond and a functional group bonded to the structure portion having an ether bond is prepared. The functional group is at least one kind selected from the second proton dissociative group and a group capable of becoming the second proton dissociative group by ion exchange. Next, the polymer A' and the organic compound B' are mixed in a solvent, and are dispersed in the same solvent (step S201). In Chemical Formula 21, R1 represents a component including carbon, and x1 represents at least one kind selected from the first proton dissociative group and a group capable of becoming the first proton dissociative group by ion exchange, and n is n>1.

Next, the solvent is evaporated to dryness (step S202). After that, if necessary, for example, a DC current is applied to the dried solvent in a hydrogen atmosphere so as to carry out ion exchange, and thereby the first proton dissociative group X1 and the second proton dissociative groups X2 and X3 are prepared (step S203). Thereby, the proton conductor according to the embodiment can be obtained. Also, in this case, affinity of the dispersed solvent for the polymer A' and the organic compound B' is controlled so as to be capable of obtaining a uniform complex by interaction between at least one kind x1 which is selected from the first proton dissociative group of the polymer A' and a group capable of becoming the first dissociative group, and the ether bond of the organic compound B'. In addition, the method is applicable in the case where the organic compound B is in a liquid state, or the organic compound is dissolved in a solvent so as to change into a liquid state.

The proton conductor acts as follows.

In the proton conductor, when an electric field is applied, the ether bond included in the organic compound B interacts with the protons included in the polymer A, so as to transfer the protons with a segment motion of the polymer A. Moreover, the number of protons in the proton conductor is increased by the second proton dissociative groups X2 and X3 of the organic compound B. Therefore, higher conductivity can be obtained without water as a proton carrier, and superior properties can be obtained in a wider temperature range.

Thus, the proton conductor according to the embodiment comprises the organic compound B including the ether bond and the second proton dissociative groups X2 and X3, so proton transfer can be promoted by the site of the ether bond, and the number of protons can be increased by the second proton dissociative groups X2 and X3, thereby, the proton transfer can be smoothed. Therefore, the proton conductor is not required to retain water, and can obtain higher proton conductivity in a wider temperature range.

Specifically, when the organic compound B is represented by Chemical Formula 20, and the total number of carbons (m+o) in the components R2 and R3 is within a range of $\frac{1}{6} \leq 1/(m+o) \leq \frac{1}{2}$, the number of units of the ether bond can be increased so as to further promote the proton transfer.

Moreover, when a ratio of the number of units (2b) of the second proton dissociative groups X2 and X3 to the number of units (a×n) of the first proton dissociative group X1 is within a range of $2 \leq 2b/(a \times n) \leq 50$, and more specifically within a range of $25 \leq 2b/(a \times n) \leq 50$, while maintaining the stability of the proton conductor, the number of protons can be increased so as to further smooth the proton transfer.

Further, when a ratio of the number of units (b×p) of the ether bond of the organic compound B to the number of units (a×n) of the first proton dissociative group X1 is within a range of $5 \leq (b \times p)/(a \times n) \leq 50$, and more specifically within a range of $25 \leq (b \times p)/(a \times n) \leq 50$, while maintaining the stability of the proton conductor, the number of units of the ether bond can be increased so as to further promote the proton transfer.

In addition, in the method of producing the proton conductor according to the embodiment, the polymer A is impregnated with the organic compound B or a solution prepared by dissolving the organic compound B in a solvent, or the polymer A' and the organic compound B' are mixed with each other in a solvent, then the solvent is evaporated. Therefore, the proton conductor according to the embodiment can be easily and uniformly produced.

[Second Embodiment]

A proton conductor according to a second embodiment of the invention has the same structure as the proton conductor according to the first embodiment, except that the proton conductor comprises an organic compound C instead of or in addition to the organic compound B. The organic compound C is represented by Chemical Formula 22. In Chemical Formula 22, R4 represents a component including carbon, and X4 and X5 represent third proton dissociative groups, and the number of carbons in the component R4 is within a range from 1 to 4.

The component R4 has, for example, the same structure as the components R2 and R3 of the organic compound B. Further, the component R4 may be the same as or different from the component R1 of the polymer A or the components R2 and R3 of the organic compound B. The third proton dissociative groups X4 and X5 have, for example, the same structure as the second proton dissociative groups X2 and X3 of the organic compound B. The third proton dissociative groups X4 and X5 may be the same as or different from each other, and may be the same as or different from the first proton dissociative group X1 or the second proton dissociative groups X2 and X3.

As such an organic compound C, for example, a glycol compound such as ethylene glycol, propylene glycol, butylene glycol or the like and a derivative thereof are cited. The organic compound C may include one kind or a mixture of two or more kinds.

The organic compound C has a function of increasing the number of protons by the third proton dissociative groups X4 and X5, and a function as an ion carrier which transfers protons. It is considered that when the third proton dissociative groups X4 and X5 are selected from the group consisting of the —$SO_3H$ group, the —COOH group, the —OH group and so on which are described above, an oxygen site therein functions like the ether bond in the organic compound B. Further, the organic compound C has a low vapor pressure, so the organic compound C is stably introduced into the polymer A. Therefore, the organic compound C can exert these functions in a wider temperature range. In other words, the organic compound C plays the same role as the organic compound B.

Assuming that a mole ratio between the polymer A and the organic compound C is the polymer A: the organic compound C=a:c, preferably, a mixed ratio between the polymer A and the organic compound C is controlled so that a ratio of the number of units (=2c) of the third proton dissociative groups X4 and X5 to the number of units (=a×n) of the first proton dissociative group X1 is within a range of $2 \leq 2c/(a \times n) \leq 50$, and more preferably, within a range of $25 \leq 2c/(a \times n) \leq 50$. When the number of units of the third proton dissociative groups X4 and X5 is too small, the proton transfer cannot be sufficiently smoothed, and on the other hand, when the number is too large, the stability of the proton conductor is compromised.

In the case where in addition to the polymer A and the organic compound C, the organic compound B is included, assuming that a mole ratio among the polymer A, the organic compound B and the organic compound C is the polymer A: the organic compound B: the organic compound C=a:b:c, a ratio of the number of units (=2b) of the second proton dissociative groups X2 and X3 and the number of units (=2c) of the third dissociative groups X4 and X5 to the number of units (=a×n) of the first proton dissociative group X1 is preferably within a range of $2 \leq (2b+2c)/(a \times n) \leq 50$, and more preferably within a range of $25 \leq (2b+2c)/(a \times n) \leq 50$.

The proton conductor with such a structure can be produced in the same manner as the first embodiment (refer to FIGS. 1 and 2). More specifically, the polymer A is impregnated with the organic compound C or a solution prepared by dissolving the organic compound C in a solvent, or the polymer A is impregnated with a mixture of the organic compound B and the organic compound C or a solution prepared by dissolving the organic compound B and the organic compound C in a solvent, thereby the proton conductor can be obtained. Moreover, after the polymer A' including a structure portion represented by Chemical Formula 21 and the organic compound C' represented by Chemical Formula 23 are mixed in a solvent, and the solvent is evaporated, if necessary, ion exchange is carried out, or after the polymer A', the organic compound B' and the organic compound C' are mixed in a solvent, and the solvent is evaporated, if necessary, ion exchange is carried out, thereby the proton conductor can be obtained. In Chemical Formula 23, R4 represents a component including carbon, and x4 and x5 represent at least one kind selected from the third proton dissociative group and a group capable of becoming the third proton dissociative group by ion exchange, and the number of carbons in the component R4 is within a range from 1 to 4.

Thus, the proton conductor according to the embodiment comprises the organic compound C represented by Chemical Formula 22, so the number of protons can be increased by the third proton dissociative groups X4 and X5, thereby proton transfer can be smoothed, and the organic compound C can promote the proton transfer as an ion carrier. Therefore, the proton conductor is not required to retain water, and can obtain higher proton conductivity in a wider temperature range.

[Third Embodiment]

A single ion conductor according to a third embodiment of the invention is a mixed complex including a polymer D and an organic compound E. The polymer D has the same structure as the polymer A in the first embodiment, except that the polymer D includes a first cation dissociative group Z1 instead of the first proton dissociative group X1. In other words, the polymer D includes a structure portion represented by Chemical Formula 24. In Chemical Formula 24, R1 represents a component including carbon, and Z1 represents the first cation dissociative group, and n is n>1.

As the first cation dissociative group Z1, for example, a —$SO_3M$ group, a —COOM group, a —OM group or the like is cited, where M represents lithium (Li), sodium (Na), potassium (K) or rubidium (Rb). The first cation dissociative group Z1 is not necessarily limited to one kind, and may include two or more kinds.

The organic compound E has the same structure as the organic compound B in the first embodiment, except that the organic compound E includes second cation dissociative groups Z2 and Z3 instead of the second proton dissociative groups X2 and X3. In other words, the organic compound E includes a structure portion having an ether bond and the second cation dissociative groups bonded to the structure portion an ether bond, and an organic compound represented by, for example, Chemical Formula 25 is preferable as the organic compound E. In Chemical Formula 25, each of R2 and R3 represents a component including carbon, and Z2 and Z3 represent the second cation dissociative groups, and p is p>0.

As the second cation dissociative groups Z2 and Z3, for example, the same group as the first cation dissociative group Z1 is cited. Also, the second cation dissociative groups Z2 and Z3 are not necessarily limited to one kind, and may include two or more kinds. Further, the second cation dissociative groups Z2 and Z3 may be the same as or different from each other, and may be the same as or different from the first cation dissociative group Z1.

The organic compound E has the same functions as the organic compound B in the first embodiment except that protons in the first embodiment are replaced with cations of lithium, sodium, potassium or rubidium. In other words, the ether bond functions as an ion carrier, and the number of cations is increased by the second cation dissociative groups Z2 and Z3. Therefore, a ratio of the number of units of the first cation dissociative group Z1 in the polymer D to the number of units of the second cation dissociative groups Z2 and Z3 and the number of units of the ether bond in the organic compound E preferably has the same relationship as that in the first embodiment.

For example, assuming that a mole ratio between the polymer D and the organic compound E is the polymer D: the organic compound E=d:e, a ratio of the number of units (=2e) of the second cation dissociative groups Z2 and Z3 to the number of units (=d×n) of the first cation dissociative group Z1 is preferably within a range of $2 \leq 2e/(d \times n) \leq 50$, and more preferably within a range of $25 \leq 2e/(d \times n) \leq 50$. Moreover, a ratio of the number of units (=e×p) of the ether bond of the organic compound E to the number of units (=d×n) of the first cation dissociative group Z1 is preferably within a range of $5 \leq (e \times p)/(d \times n) \leq 50$, and more preferably within a range of $25 \leq (e \times p)/(d \times n) \leq 50$. Further, as in the case of the first embodiment, the total number of carbons (m+o) per unit of the components R2 and R3 of the organic compound E is preferably within a range of $\frac{1}{6} \leq 1/(m+o) \leq \frac{1}{2}$.

The single ion conductor with such a structure can be produced, for example, through the following steps.

Figure 3:
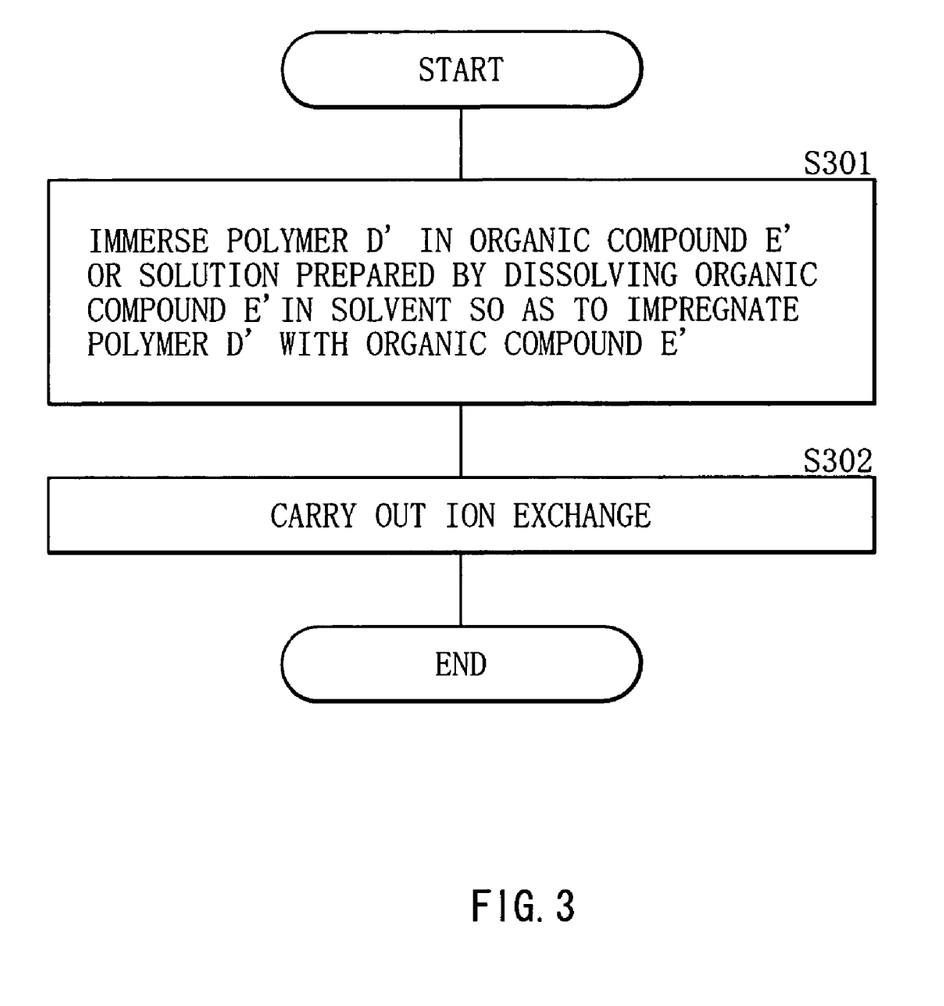
FIG. 3 is a flowchart of a method of producing a single ion conductor according to a third embodiment of the invention.

FIG. 3 shows a method of producing the single ion conductor according to the embodiment. Firstly, a polymer D' including a structure portion represented by Chemical Formula 26 is prepared, and an organic compound E' including a structure portion having an ether bond and a functional group bonded to the structure portion having an ether bond is prepared. In the organic compound E', the functional group is at least one kind selected from the second cation group and a group capable of becoming the second cation dissociative group by ion exchange. More specifically, the polymer D' may include the first cation dissociative group Z1 which is prepared by ion exchange or not. Further, the organic compound E' may include the second cation dissociative group Z2 which is prepared by ion exchange or not. In addition, ion exchange treatment is carried out, for example, through immersing in a hydroxide solution including target cations such as a lithium hydroxide solution, a sodium hydroxide solution or the like, after acid treatment. In Chemical Formula 26, R1 represent a component including carbon, and z1 represent at least one kind selected from the first cation dissociative group and a group capable of becoming the first cation dissociative group by ion exchange, and n is n>1.

Next, the polymer D' is immersed in the organic compound E' or a solution prepared by dissolving the organic compound E' in a solvent so as to impregnate the polymer D' with the organic compound E' (step S301). The first cation dissociative group Z1' or the group capable of becoming the first cation dissociative group by ion exchange in the polymer D, and the ether bond in the organic compound E' interact with each other, so the organic compound E' is uniformly introduced into the polymer D'. At this time, if necessary, vacuum treatment or heat treatment may be carried out. After that, if necessary, a DC current is applied between, for example, lithium metal plates so as to prepare the target first cation dissociative group Z1 and the second cation dissociative groups Z2 and Z3 (step S301). Thereby, the single ion conductor according to the embodiment can be obtained.

In addition, the single ion conductor can be produced in the same method shown in FIG. 2 in the first embodiment. In this case, the polymer D' including a structure portion represented by Chemical Formula 26 and the organic component E' including a structure portion having an ether bond and a functional group bonded to the structure portion having an ether bond are mixed in a solvent (refer to step S201). In the organic component E', the functional group is at least one kind selected from the second cation dissociative group and a group capable of becoming the second cation dissociative group by ion exchange. The ion exchange (refer to step S203) is carried out through applying a DC current between, for example, lithium metal plates so as to prepare the target first cation dissociative group Z1 and the target second cation dissociative groups Z2 and Z3.

Thus, the single ion conductor according to the embodiment comprises the organic compound E including the ether bond and the second cation dissociative groups Z2 and Z3, so cation transfer can be promoted by the site of the ether bond, and the number of cations can be increased by the second cation dissociative groups Z2 and Z3, thereby the cation transfer can be smoothed. Therefore, the single ion conductor can obtain higher ionic conductivity in a wider temperature range.

[Fourth Embodiment]

A single ion conductor according to a fourth embodiment of the invention has the same structure as the single ion conductor according to the third embodiment, except that the single ion conductor comprises an organic compound F instead of or in addition to the organic compound E. The organic compound F is represented by Chemical Formula 27. More specifically, the organic compound F has the same structure as the organic compound C in the second embodiment except that the organic compound F includes third cation dissociative groups Z4 and Z5 instead of the third proton dissociative groups X4 and X5. In Chemical Formula 27, R4 represents a component including carbon, and Z4 and Z5 represent the third cation dissociative groups, and the number of carbons in the component R4 is within a range from 1 to 4.

The third cation dissociative groups Z4 and Z5 have the same structures as, for example, the second cation dissociative groups Z2 and Z3. Moreover, the third cation dissociative groups Z4 and Z5 may be the same as or different from each other, and may be the same as or different from the first cation dissociative group Z1 or the second cation dissociative groups Z2 and Z3.

The organic compound F has the same functions as the organic compound C in the second embodiment except that protons in the second embodiment are replaced with cations of lithium, sodium, potassium or rubidium. In other words, the organic compound F has a function of increasing the number of cations by the third cation dissociative groups Z4 and Z5, and a function as an ion carrier which transfers cations. Therefore, a ratio among the number of units of the first cation dissociative group Z1 in the polymer D, the number of units of the third cation dissociative groups Z4 and Z5 in the organic compound F and the number of units of the second cation dissociative groups Z2 and Z3 in the organic compound E also preferably has the same relationship as that in the second embodiment.

For example, assuming that a mole ratio between the polymer D and the organic compound F is the polymer D: the organic compound F=d:f, a ratio of the number of units (=2f) of the third cation dissociative groups Z4 and Z5 to the number of units (=d×n) of the first cation dissociative group Z1 is preferably within a range of $2 \leq 2f/(d \times n) \leq 50$, and more preferably within a range of $25 \leq 2f/(d \times n) \leq 50$. Moreover, in the case where in addition to the polymer D and the organic compound F, the organic compound E is included, assuming that a mole ratio among the polymer D, the organic compound E and the organic compound F is the polymer D: the organic compound E : the organic compound F=d:e:f, a ratio of the number of units (=2e) of the second cation dissociative groups Z2 and Z3 and the number of units (=2f) of the third cation dissociative groups Z4 and Z5 to the number of units (=d×n) of the first cation dissociative group Z1 is preferably within a range of $2 \leq (2e+2f)/(d \times n) \leq 50$, and more preferably within a range of $25 \leq (2e+2f)/(d \times n) \leq 50$.

The single ion conductor with such a structure can be produced through the same method as that in the third embodiment. More specifically, the polymer D' including a structure portion represented by Chemical Formula 26 is impregnated with the organic compound F' represented by Chemical Formula 28 or a solution prepared by dissolving the organic compound F' in a solvent, or the polymer D' is impregnated with a mixture of the organic compound E' and the organic compound F' or a solution prepared by dissolving the organic compound E' and the organic compound F' in a solvent, and then ion exchange is carried out if necessary, thereby the single ion conductor can be obtained. Moreover, after the polymer D' and the organic compound F', or the polymer D', the organic compound E' and the organic compound F' are mixed in a solvent, and the solvent is evaporated, ion exchange is carried out if necessary, thereby the single ion conductor can be obtained. In Chemical Formula 28, R4 represents a component including carbon, and each of z4 and z5 represents at least one kind selected from the third cation dissociative group and a group capable of becoming the third dissociative group by ion exchange, and the number of carbons in the component R4 is within a range from 1 to 4.

Thus, the single ion conductor according to the embodiment comprises the organic compound F represented by Chemical Formula 27, so the number of cations can be increased by the third cation dissociative groups Z4 and Z5, thereby cation transfer can be smoothed, and the organic compound F can promote cation transfer as an ion carrier. Therefore, higher ionic conductivity can be obtained in a wider temperature range.

Specific examples of the invention will be described in detail below.

EXAMPLE 1-1

Firstly, as the polymer A, a perfluorosulfonic acid high molecular weight ion-exchange film in which the molecular weight (acid equivalent) per mol of the first proton dissociative group X1 was 1200 g/mol was prepared, and a 10% hydrogen peroxide solution and a 0.5 mol/l sulfuric acid solution were used to carry out acid treatment, thereby the first proton dissociative group X1 became a sulfonic acid group. Next, after the perfluorosulfonic acid high molecular weight ion-exchange film was dried at 120° C. and 1333 Pa for 24 hours, the perfluorosulfonic acid high molecular weight ion-exchange film was immersed in polyethylene glycol (with a weight-average molecular weight of 600), which was the organic compound B, at 80° C. for 100 hours, and was impregnated with polyethylene glycol. Thereby, the proton conductor with a composition shown in Table 1 was obtained. The amount of the organic compound B introduced was determined by a difference in the weight of the polymer A before and after immersing in the organic compound B.

The obtained proton conductor was cut so as to have an area of 2 cm$^2$, and proton conductivities at 70° C., 30° C. and −20° C. were determined by AC impedance measurement. The obtained results are shown in Table 2. As shown in Table 2, the proton conductivities at 70° C., 30° C. and −20° C. were $1.8\%10^{-4}$ S/cm, $3.8\%10^{-5}$ S/cm and $1.5\%10^{-7}$ S/cm, respectively, which were very high.

EXAMPLE 1-2

Firstly, as the polymer A, a perfluorocarboxylic acid high molecular weight ion-exchange film in which the molecular weight (acid equivalent) of the first proton dissociative group X1 per mol was 2000 g/mol was prepared, and as in the case of Example 1-1, acid treatment was carried out, thereby the first proton dissociative group X1 became a carboxylic acid group. Next, after the perfluorocarboxylic acid high molecular weight ion-exchange film was dried in the same conditions as those in Example 1-1, the ion-exchange film was immersed in diethylene glycol (containing 50 ppm or less of water) at 80° C. for 100 hours so as to be impregnated with diethylene glycol. Thereby, the proton conductor having a composition shown in Table 1 was obtained. In the proton conductor of Example 1-2, the proton conductivities were determined in the same manner as in the case of Example 1-1. The obtained results are shown in Table 2.

As shown in Table 2, the proton conductivities at 70° C., 30° C. and −20° C. were $1.1\%10^{-3}$ S/cm, $5.5\%10^{-4}$ S/cm and $4.3\%10^{-5}$ S/cm, respectively, which were as high as those in Example 1-1.

EXAMPLE 1-3

Firstly, as the polymer A', a perfluorosulfonic acid high molecular weight ion-exchange resin in which the molecular weight of the group capable of becoming the first proton dissociative group by ion exchange per mol was 1200 g/mol was dissolved in a solvent prepared by mixing methanol, ethanol and propanol in a concentration of 5 wt % so as to produce a mixed solution. Next, after 4 g of diethylene glycol, which was the organic compound B', was added to and mixed with 100 g of the mixed solution, the mixed solution was dried at 60° C. and 13332 Pa for 48 hours, thereby a white semi-transparent film including the polymer A' and the organic compound B' was obtained. Next, the obtained film was sandwiched between carbon sheets, and a DC current of 1 mA/cm$^2$ was applied to the film for 12 hours in a hydrogen atmosphere to carry out hydrogen substitution, and then the first cation dissociative group X1 became a sulfonic acid group. Thereby, the proton conductor having a composition shown in Table 1 was obtained. In the proton conductor of Example 1-3, in the same manner as in the case of Example 1-1, proton conductivities were determined. The obtained results are shown in Table 2.

As shown in Table 2, the proton conductivities at 70° C., 30° C. and −20° C. were $2.4\%10^{-3}$ S/cm, $7.5\%10$-4 S/cm and $6.9\%10^{-7}$ S/cm, which were as high as those in Example 1-1.

EXAMPLE 1-4

Firstly as the polymer A, a perfluorocarboxylic acid high molecular weight ion-exchange film in which the molecular weight (acid equivalent) of the first proton dissociative group X1 per mol was 2000 g/mol was prepared, and as in the case of Example 1-1, acid treatment was carried out, thereby the first proton dissociative group X1 became a carboxylic acid group. Next, the perfluorocarboxylic acid high molecular weight ion-exchange film was dried in the same conditions as those in Example 1-1. Then, as the organic compound B, polyethylene glycol in which a carboxylic acid group was substituted at an end (polyethylene glycol carboxylic acid ether with a weight-average molecular weight of 200) was prepared, and the dried perfluorocarboxylic acid high molecular weight ion-exchange film was immersed in the polyethylene glycol at 50° C. for 100 hours so as to be impregnated with the polyethylene glycol. Thereby, the proton conductor having a composition shown in Table 1 was obtained. In the proton conductor of Example 1-4, as in the case of Example 1-1, proton conductivities were determined. The obtained results are shown in Table 2.

As shown in Table 2, the proton conductivities at 70° C., 30° C. and −20° C. were $2.1\%10^{-3}$ S/cm, $6.2\%10^{-4}$ S/cm and $5.4\%10^{-5}$ S/cm, respectively, which were as high as those in Example 1-1.

EXAMPLE 1-5

Firstly, as the polymer A, a perfluorosulfonic acid high molecular weight ion-exchange film in which the molecular weight (acid equivalent) of the first proton dissociative group X1 per mol was 1200 g/mol was prepared, and as in the case of Example 1-1, acid treatment was carried out, so the first proton dissociative group X1 became a sulfonic acid group. Next, after the perfluorosulfonic acid high molecular weight ion-exchange film was dried in the same conditions as those in Example 1-1, the perfluorosulfonic acid high molecular weight ion-exchange film was immersed in ethylene glycol, which was the organic compound C, at 80° C. for 100 hours so as to be impregnated with ethylene glycol. Thereby, the proton conductor having a composition shown in Table 1 was obtained. In the proton conductor of Example 1-5, as in the case of Example 1-1, proton conductivities were determined. The obtained results are shown in Table 2.

As shown in Table 2, the proton conductivities at 70° C., 30° C. and −20° C. were $4.0\%10^{-3}$ S/cm, $1.4\%10\text{-}3$ S/cm and $4.0\%10^{-4}$ S/cm, respectively, which were as high as those in Example 1-1.

COMPARATIVE EXAMPLE 1-1

The proton conductor was produced in the same manner as in the case of Example 1-1, except that as an organic compound, polyethylene glycol in which a methyl group was substituted at an end (polyethylene glycol methyl ether with a weight-average molecular weight of 600) was used instead of polyethylene glycol. Thereby, the proton conductor having a composition shown in Table 1 was obtained. In the proton conductor of Comparative Example 1-1, as in the case of Example 1-1, proton conductivities were determined. The obtained results are shown in Table 2.

As shown in Table 2, the proton conductivities at 70° C., 30° C. and −20° C. were $1.2\%10^{-4}$ S/cm, $1.3\%10^{-5}$ S/cm and $3.7\%10^{-8}$ S/cm, respectively, which were lower than those in Examples 1-1 through 1-5.

Conclusion from Examples 1-1 through 1-5

Accordingly, it was found out that when the organic compound B having the second proton dissociative groups X2 and X3 or the organic compound C having the third proton dissociative groups X4 and X5 was included, superior proton conductivity could be obtained. Moreover, it was found out from the results of Examples 1-1 through 1-5 that the first proton dissociative group X1, the second proton dissociative groups X2 and X3 and the third proton dissociative groups X4 and X5 were any of the —SO$_3$H group, the —COOH group and the —OH group. Further, it was found out that in either of the two methods described in the above embodiments, superior proton conductor could be obtained.

EXAMPLE 2-1

Firstly, as the polymer D, the same perfluorosulfonic acid high molecular weight ion-exchange film as that in Example 1-1 was prepared, and as in the case of Example 1-1, after acid treatment was carried out, and the perfluorosulfonic acid high molecular weight ion-exchange film was dried, the perfluorosulfonic acid high molecular weight ion-exchange film was impregnated with a 2 mol/l lithium hydroxide solution for 24 hours or over, and ion exchange was carried out, thereby the first cation dissociative group Z1 became a —SO$_3$Li group. The film after the ion exchange was immersed in a sodium hydroxide solution so as to carry out neutralization titration by hydrochloric acid. Then, when the amount of remained protons was determined, the ion exchange rate was 90% or over. Next, after the film after the ion exchange was dried in the same conditions as those in Example 1-1, the film was immersed in ethylene glycol, which was the organic compound F', at 80° C. for 100 hours so as to be impregnated with ethylene glycol. Next, lithium metal plates were attached onto both sides of the film impregnated with the organic compound F', and then when a DC current of 20 mA was applied to the film for 10 hours, a —OH group of ethylene glycol became a —OLi group, thereby the third cation dissociative groups Z4 and Z5 were prepared. Thereby, the single ion conductor having a composition shown in Table 3 was obtained. As in the case of Example 1-1, in the obtained single ion conductor, ionic conductivities were determined. The obtained results are shown in Table 4.

As shown in Table 4, the ionic conductivities at 70° C., 30° C. and −20° C. were $2.7\%10^{-4}$ S/cm, $4.0\%10^{-5}$ S/cm and $1.0\%10^{-5}$ S/cm which were very high.

EXAMPLE 2-2

The single ion conductor having a composition shown in Table 3 was obtained as in the case of Example 2-1, except that diethylene glycol, which was the organic compound E', was used instead of ethylene glycol. In other words, as the organic compound E, diethylene glycol in which a —OLi group was substituted for a —OH group was included. In the single ion conductor of Example 2-2, as in the case of Example 1-1, ionic conductivities were determined. The obtained results are shown in Table 4. As shown in Table 4, the ionic conductivities at 70° C., 30° C. and −20° C. were $7.0\%10^{-5}$ S/cm, $1.0\%10^{-5}$ S/cm and $3.6\%10^{-7}$ S/cm, respectively, which were very high.

EXAMPLE 2-3

Firstly, as the polymer D', a perfluorosulfonic acid high molecular weight ion-exchange resin in which the molecular weight of the group z1 capable of becoming the first cation dissociative group by ion exchange per mol was 1200 g/mol was dissolved in a solvent prepared by mixing methanol, ethanol and propanol in a concentration of 5 wt % so as to produce a mixed solution. Next, after 4 g of diethylene glycol, which was the organic compound E', was added to and mixed with 100 g of the mixed solution, the mixed solution was dried at 60° C. and 13332 Pa for 48 hours, thereby a white semi-transparent film including the polymer D' and the organic compound E' was obtained. Then, the obtained film was cut into a 2 cm square piece, and lithium metal plates were attached onto both side of the film. Then, a DC current of 20 mA was applied to the film for 10 hours, and thereby the first cation dissociative group Z1 and the second cation dissociative groups Z2 and Z3 became —OLi groups. Thereby, the single ion conductor having a composition shown in Table 3 was obtained. In the single ion conductor of Example 2-3, as in the case of Example 1-1, ionic conductivities were determined. The obtained results are shown in Table 4.

As shown in Table 4, the ionic conductivities at 70° C., 30° C. and −20° C. were $8.7 \times 10^{-5}$ S/cm, $5.6 \times 10^{-6}$ S/cm and $7.2 \times 10^{-7}$ S/cm, respectively, which were very high.

COMPARATIVE EXAMPLE 2-1

The single ion conductor having a composition shown in Table 3 was obtained in the same manner as in the case of Example 2-1, except that ethylene glycol dimethyl ether (dimethoxyethane) was used instead of ethylene glycol. In the single ion conductor of Comparative Example 2-1, as in the case of Example 1-1, ionic conductivities were determined. The obtained results are shown in Table 4. As shown in Table 4, the ionic conductivities at 70° C., 30° C. and −20° C. were $8.7 \times 10^{-6}$ S/cm, $5.6 \times 10^{-7}$ and $7.2 \times 10^{-8}$ S/cm, respectively, which were lower than those in Examples 2-1 through 2-3.

COMPARATIVE EXAMPLE 2-2

The single ion conductor having a composition shown in Table 3 was obtained in the same manner as in the case of Example 2-1, except that polyethylene glycol in which a methyl group was substituted at an end (with a weight-average molecular weight of 600) was used instead of ethylene glycol. In the single ion conductor of Comparative Example 2-2, as in the case of Example 1-1, ionic conductivities were determined. The obtained results are shown in Table 4. As shown in Table 4, the ionic conductivities at 70° C., 30° C. and −20° C. were $1.2 \times 10^{-5}$ S/cm, $8.1 \times 10^{-8}$ S/cm and not measurable, respectively, which were lower than those in Examples 2-1 through 2-3.

Conclusion from Examples 2-1 through 2-3

Accordingly, it was found out that when the organic compound E having the second cation dissociative groups Z2 and Z3, or the organic compound F having the third cation dissociative groups Z4 and Z5 was included, the single ion conductor could obtain superior ionic conductivity.

As described above, the present invention is described referring to the embodiments and Examples, however, the present invention is not limited to the embodiment and Examples, and can be variously modified. For example, in the above embodiments and the above Examples, the polymers A and D are described referring to specific examples, but any other polymer having the component R1 and the first proton dissociative group X1 or the first cation dissociative group Z1 bonded to the component R1 may be applicable.

Moreover, in the above embodiments and Examples, the organic compounds B and E are described referring to specific examples, but any other organic compound including a structure portion having an ether bond and the second proton dissociative groups or the second cation dissociative groups bonded to the structure portion having an ether bond may be applicable.

Further, in the above embodiments and Examples, the methods of producing the proton conductor and the single ion conductor according to the invention are described in detail, but the proton conductor and the single ion conductor may be produced through any other method.

As described above, the proton conductor or the single ion conductor according to the invention comprises the organic compound including a structure portion having an ether bond, and the second proton dissociative group or the second cation dissociative group bonded to the structure portion having an ether bond, so carrier transfer can be promoted by the site of the ether bond, and carrier concentration can be increased by the second proton dissociative group or the second cation dissociative group, thereby the carrier transfer can be smoothed. Therefore, higher conductivity can be obtained in a wider temperature range.

Moreover, the proton conductor or the single ion conductor according to an aspect of the invention comprises an organic compound including a component in which the number of carbons is four or less, and the third proton dissociative group or the third cation dissociative group bonded to the component, so carrier concentration can be increased by the third proton dissociative group or the third cation dissociative group, thereby carrier transfer can be smoothed and promoted. Therefore, higher conductivity can be obtained in a wider temperature range.

Further, in the method of producing the proton conductor or the method of producing the single ion conductor according to the invention, the polymer is impregnated with the organic compound or a solution prepared by dissolving the organic compound in a solvent, or the polymer and the organic compound are mixed in a solvent, and then the solvent is evaporated, so the proton conductor or the single ion conductor according to the invention can be easily and uniformly produced.

Obviously many modifications and variations of the present invention are possible in the light of the above teachings. It is therefore to be understood that within the scope of the appended claims the invention may be practiced otherwise than as specifically described.

-continued (CHEMICAL FORMULA 7)

$$\begin{array}{c} X1 \\ | \\ -\!\!\!+\!\!R1\!\!\!+_n\!\!\!- \end{array}$$

(CHEMICAL FORMULA 8)

$$\begin{array}{c} x1 \\ | \\ -\!\!\!+\!\!R1\!\!\!+_n\!\!\!- \end{array}$$

(CHEMICAL FORMULA 9)

$$\begin{array}{c} X1 \\ | \\ -\!\!\!+\!\!R1\!\!\!+_n\!\!\!- \end{array}$$
$$X4\!-\!R4\!-\!X5$$

(CHEMICAL FORMULA 10)

(CHEMICAL FORMULA 11)

$$\begin{array}{c} x1 \\ | \\ -\!\!\!+\!\!R1\!\!\!+_n\!\!\!- \end{array}$$
$$x4\!-\!R4\!-\!x5$$

(CHEMICAL FORMULA 12)

(CHEMICAL FORMULA 13)

$$\begin{array}{c} z1 \\ | \\ -\!\!\!+\!\!R1\!\!\!+_n\!\!\!- \end{array}$$

(CHEMICAL FORMULA 14)

$$\begin{array}{c} z1 \\ | \\ -\!\!\!+\!\!R1\!\!\!+_n\!\!\!- \end{array}$$

(CHEMICAL FORMULA 15)

$$\begin{array}{c} z1 \\ | \\ -\!\!\!+\!\!R1\!\!\!+_n\!\!\!- \end{array}$$
$$z4\!-\!R4\!-\!z5$$

(CHEMICAL FORMULA 16)

(CHEMICAL FORMULA 17)

$$\begin{array}{c} z1 \\ | \\ -\!\!\!+\!\!R1\!\!\!+_n\!\!\!- \end{array}$$
$$z4\!-\!R4\!-\!z5$$

(CHEMICAL FORMULA 18)

(CHEMICAL FORMULA 19)

$$\begin{array}{c} X1 \\ | \\ -\!\!\!+\!\!R1\!\!\!+_n\!\!\!- \end{array}$$
$$X2\!\!-\!\!(R2\!-\!O\!-\!R3)_p\!\!-\!\!X3$$

(CHEMICAL FORMULA 20)

(CHEMICAL FORMULA 21)

$$\begin{array}{c} x1 \\ | \\ -\!\!\!+\!\!R1\!\!\!+_n\!\!\!- \end{array}$$
$$X4\!-\!R4\!-\!X5$$
$$x4\!-\!R4\!-\!x5$$

(CHEMICAL FORMULA 22)

(CHEMICAL FORMULA 23)

(CHEMICAL FORMULA 24)

$$\begin{array}{c} Z1 \\ | \\ -\!\!\!+\!\!R1\!\!\!+_n\!\!\!- \end{array}$$
$$Z2\!\!-\!\!(R2\!-\!O\!-\!R3)_p\!\!-\!\!Z3$$

(CHEMICAL FORMULA 25)

(CHEMICAL FORMULA 26)

$$\begin{array}{c} z1 \\ | \\ -\!\!\!+\!\!R1\!\!\!+_n\!\!\!- \end{array}$$
$$Z4\!-\!R4\!-\!Z5$$
$$z4\!-\!R4\!-\!z5$$

(CHEMICAL FORMULA 27)

(CHEMICAL FORMULA 28)

$$\begin{array}{c} X1 \\ | \\ -\!\!\!+\!\!R1\!\!\!+_n\!\!\!- \end{array}$$

(CHEMICAL FORMULA 29)

(where R1 represents a component including carbon (C), and X1 represents a first proton dissociative group, and n is n>1.)

$$X2\!\!-\!\!(R2\!-\!O\!-\!R3)_p\!\!-\!\!X3 \quad \text{(CHEMICAL FORMULA 30)}$$

(where R2 and R3 represent components including carbon, and x2 and x3 represent second proton dissociative groups, and p is p>1.)

$$\begin{array}{c} X1 \\ | \\ -\!\!\!+\!\!R1\!\!\!+_n\!\!\!- \end{array}$$

(CHEMICAL FORMULA 31)

(where R1 represents a component including carbon (C), and X1 represents a first proton dissociative group, and n is n>1.)

$$X4\text{-}R4\text{-}X5 \quad \text{(CHEMICAL FORMULA 32)}$$

(where R4 represents a component including carbon, and X4 and X5 represent third proton dissociative groups, and the number of carbons in the component R4 is within a range from 1 to 4.)

$$\begin{array}{c} Z1 \\ | \\ -\!\!\!+\!\!R1\!\!\!+_n\!\!\!- \end{array}$$

(CHEMICAL FORMULA 33)

(where R1 represents a component including carbon (C), and Z1 represents a first cation dissociative group, and n is n>1.)

$$Z2\!\!-\!\!(R2\!-\!O\!-\!R3)_p\!\!-\!\!Z3 \quad \text{(CHEMICAL FORMULA 34)}$$

(where R2 and R3 represent components including carbon, and Z2 and Z3 represent second cation dissociative groups, and p is p>1.)

$$\begin{array}{c} Z1 \\ | \\ -\!\!\!+\!\!R1\!\!\!+_n\!\!\!- \end{array}$$

(CHEMICAL FORMULA 35)

(where R1 represents a component including carbon (C), and Z1 represents a first cation dissociative group, ad n is n>1.)

$$Z4\text{-}R4\text{-}Z5 \quad \text{(CHEMICAL FORMULA 36)}$$

(where R4 represents a component including carbon, and Z4 and Z5 represent third cation dissociative groups, and the number of carbons in the component R4 is within a range from 1 to 4.)

(CHEMICAL FORMULA 37)

(where R1 represents a component including carbon (C), and X1 represents a first proton dissociative group, and n is n>1.)

(CHEMICAL FORMULA 38)

(where R1 represents a component including carbon (C), and x1 represents at least one kind selected from a first proton dissociative group and a group capable of becoming the first proton dissociative group by ion exchange, and n is n>1.)

(CHEMICAL FORMULA 39)

(where R1 represents a component including carbon (C), and X1 represents a first proton dissociative group, and n is n>1.)

X4-R4-X5  (CHEMICAL FORMULA 40)

(where R4 represents a component including carbon, and X4 and X5 represent third proton dissociative groups, and the number of carbons in the component R4 is within a range from 1 to 4.)

(CHEMICAL FORMULA 41)

(where R1 represents a component including carbon (C), and x1 represents at least one kind selected from a first proton dissociative group and a group capable of becoming the first proton dissociative group by ion exchange, and n is n>1.)

x4-R4x5  (CHEMICAL FORMULA 42)

(where R4 represents a component including carbon, and each of x4 and x5 represents at least one kind selected from a third proton dissociative group and a group capable of becoming the third proton dissociative group by ion exchange, and the number of carbons in the component R4 is within a range from 1 to 4.)

(CHEMICAL FORMULA 43)

(where R1 represents a component including carbon (C), and z1 represents a first cation dissociative group, and n is n>1.)

(CHEMICAL FORMULA 44)

(where RI represents a component including carbon (C), and z1 represents at least one kind selected from a first cation dissociative group and a group capable of becoming the first cation dissociative group by ion exchange, and n is n>1.)

(CHEMICAL FORMULA 45)

(where R1 represents a component including carbon (C), and z1 represents at least one kind selected from a first cation dissociative group and a group capable of becoming the first cation dissociative group by ion exchange, and n is n>1.)

z4-R4-z5  (CHEMICAL FORMULA 46)

(where R4 represents a component including carbon, and each of z4 and z5 represents at least one kind selected from a third cation dissociative group and a group capable of becoming the third cation dissociative group by ion exchange, and the number of carbons in the component R4 is within a range from 1 to 4.)

(CHEMICAL FORMULA 47)

(where R1 represents a component including carbon (C), and z1 represents at least one kind selected from a first cation dissociative group and a group capable of becoming the first cation dissociative group by ion exchange, and n is n>1.)

z4-R4-z5  (CHEMICAL FORMULA 48)

(where R4 represents a component including carbon, and each of z4 and z5 represents at least one kind selected from a third cation dissociative group and a group capable of becoming the third cation dissociative group by ion exchange, and the number of carbons in the component R4 is within a range from 1 to 4.)

TABLE 1

| | FIRST PROTON DISSOCIATIVE GROUP X1 | SECOND AND THIRD PROTON DISSOCIATIVE GROUPS X2,X3,X4,X5 | AMOUNT OF ORGANIC COMPOUNDS B AND C INTRODUCED (b + c)/(a + b + c) | COMPOSITION | | |
|---|---|---|---|---|---|---|
| | | | | $\frac{1}{(m+o)}$ | $\frac{(2b+2c)}{(a \times n)}$ | $\frac{(b \times p)}{(a \times n)}$ |
| EXAMPLE 1-1 | —$SO_3H$ | —OH | 0.37 | ½ | 2.03 | 6.4 |
| EXAMPLE 1-2 | —COOH | —OH | 0.31 | ¼ | 11.01 | 16.5 |
| EXAMPLE 1-3 | —$SO_3H$ | —OH | 0.44 | ¼ | 32.1 | 48.1 |
| EXAMPLE 1-4 | —COOH | —COOH | 0.42 | ½ | 8.1 | 22.7 |
| EXAMPLE 1-5 | —$SO_3H$ | —OH | 0.40 | ½ | 27.0 | — |
| COMPARATIVE EXAMPLE 1-1 | —$SO_3H$ | —$CH_3$ ※1 | 0.28 | ½ | —※2 | 4.6 |

※1 A group exisiting in a position corresponding to a proton dissociative group is shown as a reference.
※2 Comparative Example 1-1 has no proton dissociative group, so the value of (2b + 2c)/(a × n) does not exist.

TABLE 2

| | PROTON CONDUCTIVITY (S/cm) | | |
|---|---|---|---|
| | 70° C. | 30° C. | −20° C. |
| EXAMPLE 1-1 | $1.8 \times 10^{-4}$ | $3.8 \times 10^{-5}$ | $1.5 \times 10^{-7}$ |
| EXAMPLE 1-2 | $1.1 \times 10^{-3}$ | $5.5 \times 10^{-4}$ | $4.3 \times 10^{-5}$ |
| EXAMPLE 1-3 | $2.4 \times 10^{-3}$ | $7.5 \times 10^{-4}$ | $6.9 \times 10^{-5}$ |
| EXAMPLE 1-4 | $2.1 \times 10^{-3}$ | $6.2 \times 10^{-4}$ | $5.4 \times 10^{-5}$ |
| EXAMPLE 1-5 | $4.0 \times 10^{-3}$ | $1.4 \times 10^{-3}$ | $4.0 \times 10^{-4}$ |
| COMPARATIVE EXAMPLE 1-1 | $1.2 \times 10^{-4}$ | $1.3 \times 10^{-5}$ | $3.7 \times 10^{-8}$ |

TABLE 3

| | FIRST CATION DISSOCIATIVE GROUP Z1 | SECOND AND THIRD CATION DISSOCIATIVE GROUPS Z2,Z3,Z4,Z5 | AMOUNT OF ORGANIC COMPOUNDS E AND F INTRODUCED (e + f)/(d + e + f) | COMPOSITION | | |
|---|---|---|---|---|---|---|
| | | | | $\frac{1}{(m+o)}$ | $\frac{(2e+2f)}{(d \times n)}$ | $\frac{(e \times p)}{(d \times n)}$ |
| EXAMPLE 2-1 | —$SO_3Li$ | —OLi | 0.38 | ½ | 10.3 | — |
| EXAMPLE 2-2 | —$SO_3Li$ | —OLi | 0.33 | ¼ | 8.9 | 5.94 |
| EXAMPLE 2-3 | —$SO_3Li$ | —OLi | 0.44 | ¼ | 13.1 | 6.9 |
| COMPARATIVE EXAMPLE 2-1 | —$SO_3Li$ | —$CH_3$ ※1 | 0.31 | ½ | —※2 | 3.4 |
| COMPARATIVE EXAMPLE 2-1 | —$SO_3Li$ | —$CH_3$ ※1 | 0.29 | ¼ | —※2 | 3.2 |

※1 A group exisiting in a position corresponding to a cation dissociative group is shown as a reference.
※2 Comparative Examples 2-1 and 2-2 have no cation dissociative group, so the value of (2e + 2f)/(d × n) does not exist.

TABLE 4

| | IONIC CONDUCTIVITY (S/cm) | | |
|---|---|---|---|
| | 70° C. | 30° C. | −20° C. |
| EXAMPLE 2-1 | $2.7 \times 10^{-4}$ | $4.0 \times 10^{-5}$ | $1.0 \times 10^{-5}$ |
| EXAMPLE 2-2 | $7.0 \times 10^{-5}$ | $1.0 \times 10^{-5}$ | $3.6 \times 10^{-7}$ |
| EXAMPLE 2-3 | $8.7 \times 10^{-5}$ | $5.6 \times 10^{-6}$ | $7.2 \times 10^{-7}$ |
| COMPARATIVE EXAMPLE 2-1 | $8.7 \times 10^{-6}$ | $5.6 \times 10^{-7}$ | $7.2 \times 10^{-8}$ |
| COMPARATIVE EXAMPLE 2-1 | $1.2 \times 10^{-5}$ | $8.1 \times 10^{-8}$ | NOT MEASUREABLE |

The invention claimed is:

1. A proton conductor, comprising:
   (i) a polymer comprising a moiety represented by Chemical Formula 31; and
   (ii) compound represented by Chemical Formula 32.

2. A proton conductor according to claim 1, wherein a ratio 2c/(a×n) is such that $2 \leq 2c/(a \times n) \leq 50$, a being the moles of said polymer comprising a moiety represented by Chemical Formula 31, c being the moles of the compound represented by Chemical Formula 32, n being the number of moieties of Formula R1 that are comprised in the moiety represented by Chemical Formula 31.

3. A proton conductor according to claim 1, wherein moieities X4 and X5 of the compound of Chemical Formula 32 are independently selected from the group consisting of a —$SO_3H$ moiety, a —COOH moiety and a —OH moiety.

4. A single ion conductor comprising:
   (i) a polymer comprising a moiety represented by Chemical Formula 35; and
   (ii) compound represented by Chemical Formula 36.

5. A single ion conductor according to claim 4, wherein a ratio 2f/(d×n) is such that $2 \leq 2f/(d \times n) \leq 50$, d being the moles of said polymer comprising a moiety represented by Chemical Formula 35, f being the moles of the compound represented by Chemical Formula 36, n being the number of moieties of Formula R1 that are comprised in the moiety represented by Chemical Formula 35.

6. A single ion conductor according to claim 4, wherein moieties Z4 and Z5 are independently selected from the group consisting of a —$SO_3M$ moiety, a —COOM moiety and a —OM moiety, wherein M is selected from the group consisting of lithium (Li), sodium (Na), potassium (K) or rubidium (Rb).

7. A method of producing a proton conductor, comprising the step of: contacting a polymer, said polymer comprising a moiety represented by Chemical Formula 39, with a compound represented by Chemical Formula 40 or a solution comprising said compound represented by Chemical Formula 40.

8. A method of producing a proton conductor, comprising the steps of:
   (a) contacting a polymer, said polymer comprising a moiety of Chemical Formula 41, and a mixture, said mixture comprising a compound represented by Chemical Formula 42 and a solvent, and
   (b) evaporating the solvent.

9. A method of producing a single conductor, comprising the step of: contacting a polymer, said polymer comprising a moiety represented by Chemical Formula 45, with a compound represented by Chemical Formula 40 or a solution comprising said compound represented by Chemical Formula 46.

10. A method of producing a single ion conductor, comprising the steps of:
   (a) mixing a polymer, said polymer comprising a moiety represented by Chemical Formula 47, and a mixture comprising a compound represented by Chemical Formula 48 a solvent, and
   (b) evaporating the solvent.

* * * * *